United States Patent [19]

Shibata

[11] 3,728,600
[45] Apr. 17, 1973

[54] ARRANGEMENT FOR TRANSMITTING MECHANICAL POWER FROM A DRIVING MACHINE TO A LOAD

[76] Inventor: Fukuo Shibata, 3-22, Tokiwa-cho, Nishinomiya, Japan

[22] Filed: June 16, 1971

[21] Appl. No.: 153,708

[52] U.S. Cl. .................................. 318/197, 318/197
[51] Int. Cl. .............................................. H02k 1/26
[58] Field of Search .............................. 318/205, 197

[56] References Cited

UNITED STATES PATENTS

| 3,488,567 | 1/1970 | Shibata | 318/197 |
| 912,144 | 2/1909 | Mavor | 318/205 |
| 1,983,896 | 12/1934 | Bottcher | 318/205 |
| 3,165,635 | 1/1965 | Moss et al. | 322/29 X |

Primary Examiner—Benjamin Dobeck

[57] ABSTRACT

When an electromagnetic coupling having two rotors is connected mechanically with a direct current commutating machine, in such a way that a rotor is used in common as one of the two rotors of the electromagnetic coupling and as a rotor of the direct current commutating machine, the electric machine arrangement can be a power transmitting device which is of high efficiency and has a simple construction.

If the rotor shaft of the direct current commutating machine is connected mechanically with a load, and the other rotor of the electromagnetic coupling is driven by a driving machine such as a prime mover, further rectifiers are electrically connected between armature windings of the direct current commutating machine and the electromagnetic coupling, the load can be controlled over a wide speed range.

7 Claims, 6 Drawing Figures

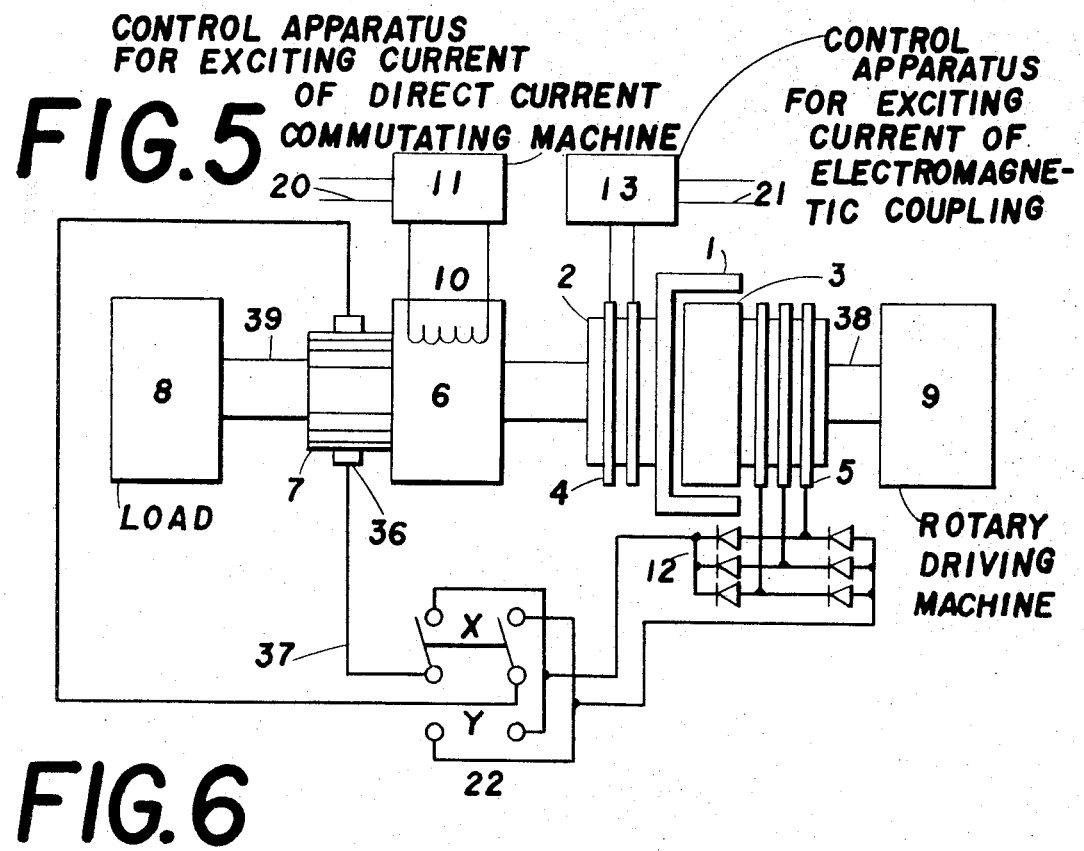
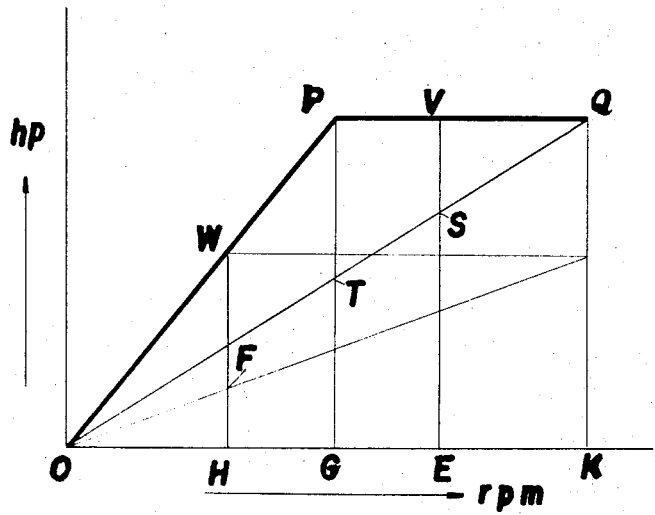

ARRANGEMENT FOR TRANSMITTING MECHANICAL POWER FROM A DRIVING MACHINE TO A LOAD

BACKGROUND OF THE INVENTION

1. Field of the invention

This invention relates to power transmitting device, and in particular, to device through which an output of a rotary driving machine is transmitted to a load and by which speed of the load can be controlled whilst speed of the rotary driving machine is kept constant. The said rotary driving machine is a machine which gives a mechanical rotary output to the load through an output shaft; for example, an electric motor, a prime mover such as a diesel, a gas turbine, a steam turbine, a water wheel, a vapor engine, a gasoline engine etc. Examples of the said load are a propeller of a ship, a wheel of a car, a fan pump etc.

2. Description of the prior art:

In some prior arrangements in which outputs of rotary driving machines are transmitted to loads, gears are used for addition or reduction of speeds. In general, a gear itself control neither the ratio of addition nor reduction of the speed, nor direction of rotation of a load. In other words, when only a gear is inserted between a rotary driving machine and a load, the speed of the load cannot be controlled or changed by the gear itself, and the direction of the rotation of the load cannot be changed if the direction of the rotation of the prime mover is kept constant.

SUMMARY OF THE INVENTION

It is the primary object of the invention to provide an arrangement transmitting an output of a rotary driving machine to a load in which the load speed can be controlled easily by the operation of a device provided in the arrangement itself.

Another object of the invention is to provide an arrangement transmitting an output of a rotary driving machine to a load in which the direction of the rotation of the load can be changed whilst keeping the direction of the rotation of the prime mover constant.

An additional object of this invention is to provide a control system affording wide speed ranges for an arrangement transmitting an output of a rotary driving machine to a load which shall be very simple and efficient in operation and which may be readily and economically manufactured and installed.

A further object of this invention is to make it possible to construct the said arrangements compactly.

A still further object of this invention is to make is possible toreduce considerably a space of an engine room of an electric car whilst keeping a total output capacity of motors large.

Other objects of this invention will in part be obvious and in part appear hereinafter.

Accordingly, this invention is disclosed in the embodiments thereof shown in the accompanying drawings and comprises the features of construction, combination of elements and arrangement of parts which will be indicated in the appended claims.

BRIEF DESCRIPTION OF THE DRAWING

Referring to the drawing:

FIG. 1, FIG. 2 and FIG. 5 illustrate diagrammatically embodiments of this invention.

FIG. 6 illustrates a characteristic curve of this invention.

DESCRIPTION OF THE PREFERRED EMBODIMENTS

Figure 1:
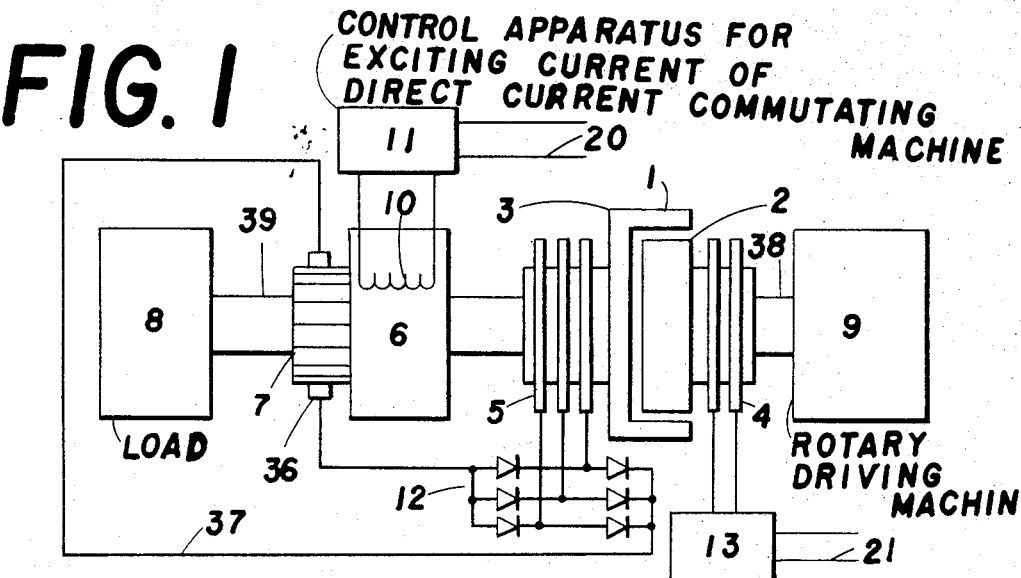
Figure 3:
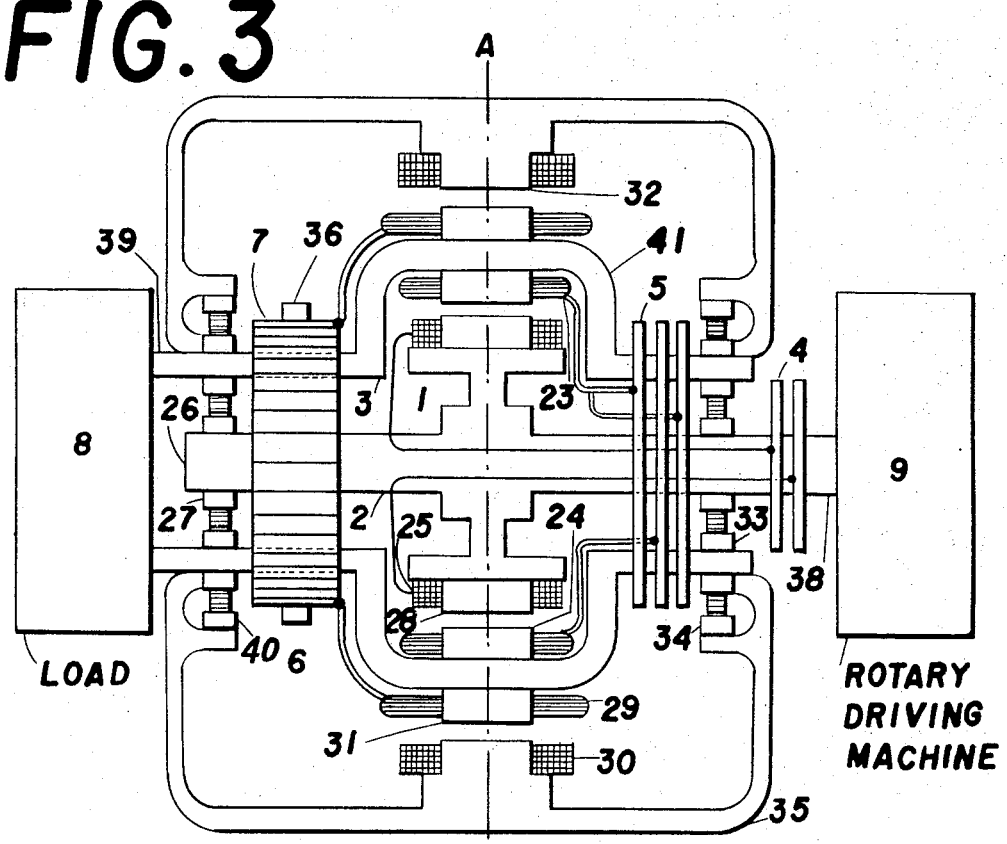
FIG. 3 illustrates one embodiment of construction of an arrangement of this invention.
Figure 4:
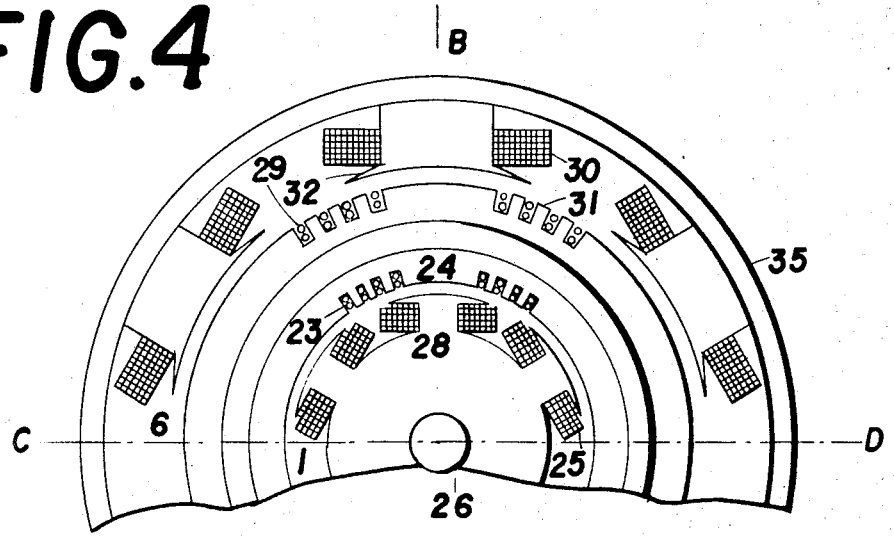
FIG. 4 shows a cross section perpendicular to a driving shaft of the construction in FIG. 3.

As shown in FIG. 1, FIG. 3 and FIG. 4, an arrangement for transmitting mechanical power from a driving machine to a load of this invention has a combination of: an electromagnetic coupling 1 having two rotors 2 and 3 called a first and a second rotor, which rotate with respect to each other and one 3 of which is provided with an and the other of which is provided with a direct current winding 25; a magnetic member 24 which has grooves burying the said armature winding 23 of the electromagnetic coupling 1 and which forms a magnetic circuit in one of the two rotors 2, 3 of the electromagnetic coupling 1; another magnetic member 28 forming a magnetic circuit which is made in the other rotor 2 of the electromagnetic coupling 1 by making the exciting current flow in the said direct current winding 25; a direct current commutating machine 6 having a stator 35 provided with field poles 32 and a rotor 41 provided with an armature winding 29 and commutators 7; a magnetic member 31 which has grooves burying the said armature winding 29 of the direct current commutating machine 6 and which forms a magnetic circuit in the rotor 41 of the direct current commutating machine 6; wherein the said second rotor 3 of the electromagnetic coupling 1 is a rotor of which a circumferential inner part of a cylinder (A part lying between the part shown by the symbol 24 and the part shown by the symbol 31 in FIG. 4 is a cylinder.) is provided with the said magnetic member 24 forming the magnetic circuit in the second rotor 3 of the said electromagnetic coupling 1 and of which is circumferential outer part of the cylinder is provided with the said magnetic member 31 forming the magnetic circuit in the rotor 41 of the said direct current commutating machine 6, and the said second rotor 3 of the electromagnetic coupling 1 is installed in a space between the stator 35 of the direct current commutating machine 6 and the first rotor 2 of the electromagnetic coupling 1, further, the first rotor 2 of the electromagnetic coupling 1 is driven by a rotary driving machine 9, and the second rotor 3 of the electromagnetic coupling 1 drives a load 8.

FIG. 4 is a drawing in section AB, shown in FIG. 3, perpendicular to a shaft 26 of the first rotor 2 of the electromagnetic 1. CD in FIG. 4 is a center line of the drawing. FIG. 3 and FIG. 4 shows that the magnetic member 28 forming the magnetic circuit of the first rotor 2 of the electromagnetic coupling 1 and the surface of the field poles 32 of the direct current commutating machine 6 exist together in a section AB perpendicular to a shaft 26 of the first rotor 2 of the electromagnetic coupling 1.

FIG. 1 illustrates diagrammatically an embodiment of this invention. In FIG. 1, the armature winding of the direct current commutating machine 6 is electrically connected with the armature winding of the electromagnetic coupling 1 through rectifiers 12, commutators 7 and brushes 36 of the direct current commutating machine 6, sliprings 5 of the electromagnetic coupling 1 and electric wiring 37. The rotor 2 of the electromagnetic coupling 1 is provided with a direct current winding 25, shown in FIG. 3 and FIG. 4, supplied with exciting current from the electric source (not shown in the drawing) through sliprings 4, a control apparatus 13 for exciting current of electromagnetic coupling and electric wiring 21.

FIG. 1 shows that the first rotor 2 of the electromagnetic coupling 1 is driven by a rotary driving machine 9 through an input shaft 38 and the second rotor 3 of the electromagnetic coupling 1 drives a load 8 through an output shaft 39.

Figure 2:
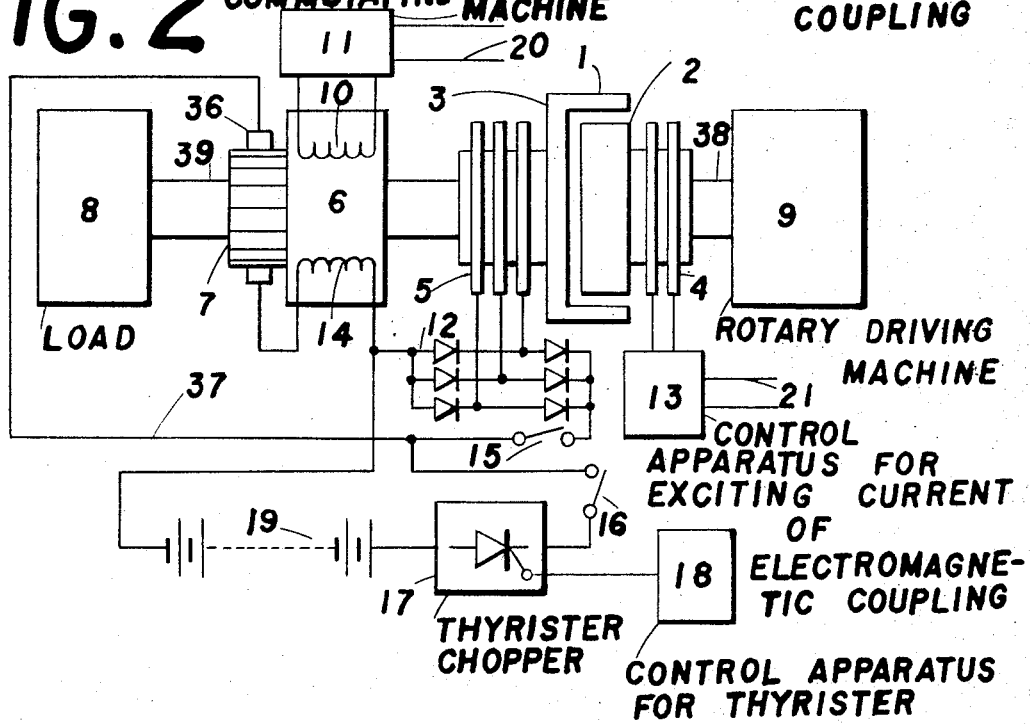

The rotor 41 of the direct current commutating machine 6 and the rotor 3 of the electromagnetic coupling 1 are in one body, as shown in FIG. 3 and FIG. 4. The stator 35 of the direct current commutating machine 6 is provided with field windings 30 as shown in FIG. 3 and FIG. 4. The field windings 30 consist of a voltage winding 10 and a current winding 14 as shown in FIG. 1 and FIG. 2. The voltage winding 10 is supplied with exciting current from an electric source (not shown in the drawing) through a control apparatus 11 for exciting current of direct current commutating machine and electric wiring 20.

In FIG. 2, it is shown that the armature winding of the direct current commutating machine 6 can be supplied with electric power both or either from the armature winding of the electromagnetic coupling 1 and/or from a battery 17 through switching apparatus 15 and 16, and a thyrister chopper 17 controlled by a control apparatus for thyrister 18.

In FIG. 5, it is so arranged that the direction of rotation of the rotor of the direct current commutating machine 6 can be either same or opposite to the direction of rotation of the rotor 3 of the electromagnetic coupling 1 driven by the rotary driving machine 9 through the electric connection X and Y of a switching device 22.

The rotor 3 having the armature winding of the electromagnetic coupling acts as the second rotor in FIG. 1 and FIG. 2, but acts as the first rotor in FIG. 5. In FIG. 3, there are four kinds of bearings 27, 33, 34 and 40.

When the first rotor 2 of the electromagnetic coupling 1 is driven by the rotary driving machine 9, the speed of the output shaft 39 of the rotor of the direct current commutating machine can be controlled either by controlling the electric current supplied to the direct current field winding of the electromagnetic coupling 1 or by controlling the electric current supplied to the voltage winding 10 of the direct current commutating machine 6. Therefore, the speed of the output shaft 39 of the rotor of the direct current commutating machine 6 can be controlled by the control apparatus 13 for exciting current of electromagnetic coupling 1 by which the electric current supplied to the direct current field winding of the electromagnetic coupling 1 can be controlled, even if the electric current supplied to the voltage winding 10 of the direct current commutating machine 6 is kept constant.

FIG. 6 represents speed-output characteristic of the arrangement shown in FIG. 1. In FIG. 6, abscissa shows revolution per minute (rpm) of the output shaft 39 of the rotor of the direct current commutating machine 6, and ordinate shows the available output power (hp) of the output shaft 39. When the available output characteristic OWP is obtained as above, the available output power of the direct current machine 6 is shown as WF, PT etc. in WH, PG etc. In other words, when the revolution per minute of the output shaft 39 is, for instance, H, the available output power of the direct current commutating machine 6 is WF and the available output power of the electromagnetic coupling 1 is FH. In a similar way, when the revolution per minute of the output shaft 39 is G, the available output power of the direct current machine 6 is PT, and the available output power of the electromagnetic coupling 1 is TG.

When the first rotor 2 of the electromagnetic coupling 1 is driven by the rotary driving machine 9, the electric current supplied to the direct current field winding of the electromagnetic coupling 1 is kept constant, and the electric current supplied to the voltage winding 10 of the direct current commutating machine 6 decreases gradually in FIG. 1, we can obtain an available output power characteristic curve PVQ, as shown in FIG. 6. In this case, if the revolution per minute of the output shaft 39 is, for instance, E, the available output power of the direct current commutating machine 6 is VS, and the available output power of the electromagnetic coupling 1 is SE. In a similar way, if the current of the voltage winding 10 of the direct current commutating machine 6 becomes zero, the revolution per minute of the output shaft 39 becomes K, and the available output power of the output shaft 39 of the rotor of the direct current commutating machine or the available output power of the rotor 2 of the electromagnetic coupling 1 becomes QK.

Thus, the load speed can be controlled easily by the operation of both or either the control apparatus 11 for exciting current of direct current commutating machine 6 and/or the control apparatus 13 for exciting current of electromagnetic coupling 1. As is understood from the arrangement of FIG. 2, the load 8 can be driven by both or either the rotary driving machine 9 and/or the battery 19.

If the direct current winding 25 in FIG. 3 or FIG. 4 is not supplied with electric current, and the switching apparatus 16 is closed in FIG. 2, the load 8 is driven by the power of battery 19. If the switching apparatus 16 is on open position, the switching apparatus 15 is closed, and the direct current winding 25 in FIG. 3 or 4 is supplied with electric current, the load 8 is driven by the power of the rotary driving machine 9.

If the direct current winding 25 in FIG. 3 or FIG. 4 is supplied with electric current and the switching apparatus 15 and 16 are closed, the load 8 can be driven by both the power of battery 19 and the rotary driving machine 9. When the load 8 is driven by battery 19, the speed of load 8 can be controlled by controlling the control apparatus 18 for thyrister chopper.

The battery 19 can be charged from the electromagnetic coupling 1 through rectifiers 12 while the load 8 is driven by the power of the rotary driving machine 9.

This arrangement can be applied to an electric car. When the arrangement is applied to an electric car, the load 8 is a wheel, and the rotary driving machine 9 is a prime mover such as a gasoline engine, steam engine etc.

As is found from FIG. 3 and FIG. 4, it is possible to construct compactly the arrangement having the operation explained until now.

I claim:

1. An arrangement for transmitting mechanical power from a driving machine to a load comprising in combination: an electromagnetic coupling having two rotors, called a first and a second rotor, which rotate with respect to each other and one of which is provided with an armature winding and the other of which is provided with a direct current winding; a magnetic member which has grooves burying the said armature winding of the electromagnetic coupling and which forms a magnetic circuit in one of the two rotors of the electromagnetic couling; another magnetic member forming a magnetic circuit which is made in the other rotor of the electromagnetic coupling by making the exciting current flow in the said direct current winding; a direct current commutating machine having a stator provided with field poles and a rotor provided with commutators and an armature winding; a magnetic member which has grooves burying the said armature winding of the direct current commutating machine and which forms a magnetic circuit in the rotor of the direct current commutating machine; wherein the said second rotor of the electromagnetic coupling is a rotor of which a circumferential inner part of a cylinder is provided with the said magnetic member forming the magnetic circuit in the second rotor of the said electromagnetic coupling and of which a circumferential outer part face of the cylinder is provided with the said magnetic member forming the magnetic circuit in the rotor of the said direct current commutating machine, and the said second rotor of the electromagnetic coupling is installed in a space between the stator of the direct current commutating machine and the first rotor of the electromagnetic coupling, further the first rotor of the electromagnetic coupling is driven by a rotary driving machine, and the second rotor of the electromagnetic coupling drives a load.

2. An arrangement as set forth in claim 1, in which the magnetic member forming the magnetic circuit of the first rotor of the electromagnetic coupling and the surface of the field poles of the direct current commutating machine exist together in a section perpendicular to a shaft of the first rotor of the electromagnetic coupling.

3. An arrangement as set forth in claim 1, in which rectifiers are electrically connected with an electric circuit between the armature winding of the electromagnetic coupling and the armature winding of the direct current commutating machine.

4. An arrangement as set forth in claim 1, in which a battery is electrically connected with the armature winding of the direct current commutating machine.

5. An arrangement as set forth in claim 4, in which a thyrister is electrically connected in the circuit between the battery and the armature winding of the direct current commutating machine.

6. An arrangement as set forth in claim 1, in which the field poles of the direct current commutating machine are excited by a voltage winding.

7. An arrangement as set forth in claim 3, in which the driving machine is a prime mover, and the load is a wheel of an electric car.

* * * * *